United States Patent
Zheng et al.

(10) Patent No.: US 10,267,976 B1
(45) Date of Patent: Apr. 23, 2019

(54) BACKLIGHT MODULE AND DISPLAY DEVICE

(71) Applicant: WUHAN TIANMA MICRO-ELECTRONICS CO., LTD., Wuhan (CN)

(72) Inventors: Zhihua Zheng, Wuhan (CN); Wei Zhou, Wuhan (CN); Jiang Chen, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 15/989,631

(22) Filed: May 25, 2018

(30) Foreign Application Priority Data

Feb. 24, 2018 (CN) .......................... 2018 1 0157043

(51) Int. Cl.
*G02B 6/00* (2006.01)
*F21V 8/00* (2006.01)

(52) U.S. Cl.
CPC ......... *G02B 6/0045* (2013.01); *G02B 6/0055* (2013.01); *G02B 6/0068* (2013.01); *G02B 6/0075* (2013.01); *G02B 6/0081* (2013.01)

(58) Field of Classification Search
CPC .................................................. G02B 6/0045
USPC ......................................................... 362/606
See application file for complete search history.

(56) References Cited

U.S. PATENT DOCUMENTS

| | | | | |
|---|---|---|---|---|
| 2011/0149595 | A1* | 6/2011 | Lin | G02B 6/0036 362/606 |
| 2015/0362653 | A1* | 12/2015 | Chang | G02B 6/0021 362/606 |
| 2016/0011633 | A1* | 1/2016 | Watanabe | G02F 1/1333 345/184 |
| 2017/0059771 | A1* | 3/2017 | Yuki | G02F 1/133615 |
| 2017/0123140 | A1* | 5/2017 | Han | G02B 6/0045 |

FOREIGN PATENT DOCUMENTS

| | | |
|---|---|---|
| CN | 103442101 A | 12/2013 |
| CN | 206292811 U | 6/2017 |

* cited by examiner

*Primary Examiner* — Christopher M Raabe
(74) *Attorney, Agent, or Firm* — Anova Law Group, PLLC

(57) ABSTRACT

A backlight module and a display device are provided. The backlight module comprises: a light guide plate having a light incident surface; and a light source disposed on at least one side of the light guide plate. A light exit surface of the light source faces the light incident surface of the light guide plate. At least one through hole is disposed in the light guide plate, and a light adjustment component is disposed in the at least one through hole.

20 Claims, 11 Drawing Sheets

US 10,267,976 B1

BACKLIGHT MODULE AND DISPLAY DEVICE

CROSS-REFERENCES TO RELATED APPLICATIONS

This application claims the priority of Chinese Patent Application No. 201810157043.9 filed on Feb. 24, 2018, the entire contents of which are incorporated herein by reference.

FIELD OF THE DISCLOSURE

The present disclosure generally relates to the display technology and, more particularly, relates to a backlight module and a display device thereof.

BACKGROUND

With the development of display technologies, demands for the screen-to-body ratio in existing display devices, such as mobile phones, are getting higher and higher. That is, the ratio between the display area and the non-display area of a display device is desired to be larger and larger, and inevitably irregular-shaped display devices are emerging. Certain irregular-shaped display devices are designed to have a closed shape (such as circular, rectangular, other regular or irregular shape), and certain other irregular-shaped display devices are designed to have an open shape (such a semi-circular, rectangular, other regular or irregular shape).

However, in existing irregular-shaped display devices, because the light source is unable to directly incident onto a region facing away from the light source, dark areas inevitably appear in the region facing away from the light source. On the other hand, because the light source directly illuminates onto an area facing the light source, bright areas appear in the region facing the light source. In particular, bright areas often appear at the corners of the irregular-shaped display devices with an open shape, however, it is substantially difficult to eliminate the bright areas merely trough adjusting a light guide plate, resulting in uneven display of images.

The disclosed backlight module and display device thereof are directed to solve one or more problems set forth above and other problems.

BRIEF SUMMARY OF THE DISCLOSURE

One aspect of the present disclosure provides a backlight module. The backlight module comprises: a light guide plate having a light incident surface; and a light source disposed on at least one side of the light guide plate. A light exit surface of the light source faces the light incident surface of the light guide plate. At least one through hole is disposed in the light guide plate, and a light adjustment component is disposed in the at least one through hole.

Another aspect of the present disclosure provides a display device. The display device comprises: a liquid crystal display panel; and a backlight module. The backlight module comprises: a light guide plate having a light incident surface; and a light source disposed on at least one side of the light guide plate. A light exit surface of the light source faces the light incident surface of the light guide plate. At least one through hole is disposed in the light guide plate, and a light adjustment component is disposed in the at least one through hole. The liquid crystal display panel is provided with a through hole at a position corresponding to the at least one through hole in the backlight module.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
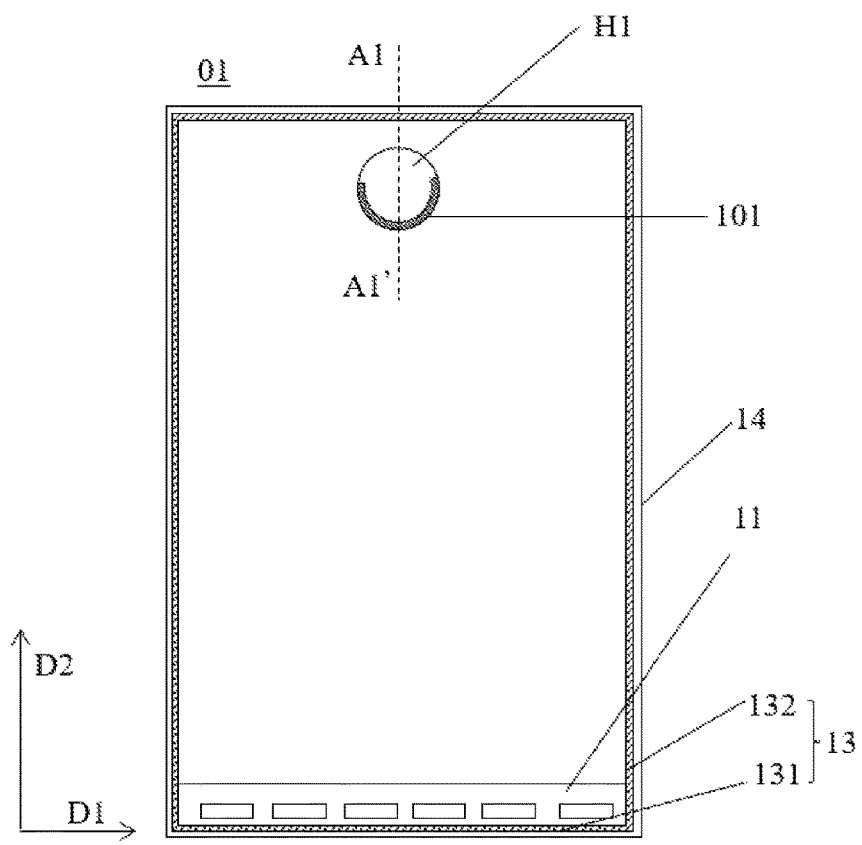
FIG. 1 illustrates a schematic diagram of an exemplary backlight module consistent with disclosed embodiments.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides an improved backlight source and display device in which the bright areas and dark areas may be suppressed at the light guide plate, and the light emitted from the backlight module may have an improved uniformity, accordingly.

The present disclosure provides a backlight module. FIG. 1 illustrates a schematic diagram of an exemplary backlight module consistent with disclosed embodiments, and FIG. 2 illustrates an exemplary A1-A1' sectional view of an exemplary backlight module in FIG. 1 consistent with disclosed embodiments.

Figure 2:
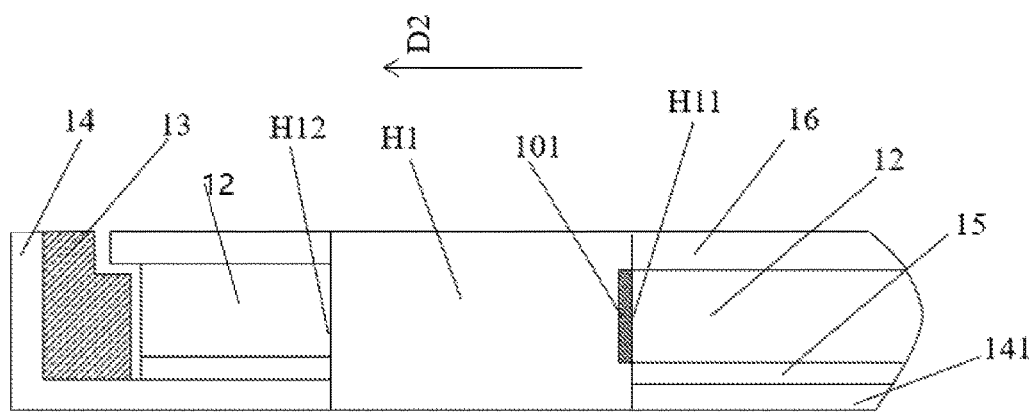
FIG. 2 illustrates an exemplary A1-A1' sectional view of an exemplary backlight module in FIG. 1 consistent with disclosed embodiments.

As shown in FIG. 1 and FIG. 2, the backlight module 01 may at least include a light guide plate 12 and a light source 11. At least one side of the light guide plate 12 may be provided with the light source 11, and a light exit surface of the light source 11 may face a light incident surface of the light guide plate 12. In one embodiment, the light source 11 may include an LED stripe, which may include a printed circuit board (not drawn) and a plurality of LEDs mounted on and electrically connected to the printed circuit board. The light exit surfaces of the plurality of LEDs may face the light incident surface of the light guide plate 12.

A plurality of light guide points may be disposed on the light incident surface of the light guide plate 12. After the light is incident onto each light guide point on the light guide plate 12, the incident light may be diffused to various angles, then reflected at the light exit surface (front surface) of the light guide plate 12 and emitted from the light exit surface (front surface) of the light guide plate 12. Through disposing various light guide points of different density and size, uniform light emission may be achieved on the light exit surface of the light guide plate 12.

In one embodiment, as shown in FIGS. 1-2, the light source 11 may be disposed only at one side of the backlight module. The backlight module 01 may further include an adhesive frame 13 and an outer frame 14. The adhesive frame 13 may include first sides 131 extending along a first direction D1 and second sides 132 extending along a second direction D2. As shown in FIG. 1, the adhesive frame 13 may include two first side 131 (for example, named as an upper first side and a lower first side arranged opposite to each other) extending along the first direction D1 and arranged along the second direction D2, and two second sides 132 (for example, named as a left second side and a right second side arranged opposite to each other) extending along the second direction D2 and arranged along the first direction D1.

The light guide plate 12 and the light source 11 may be disposed in an accommodating space surrounded by the adhesive frame 13. The light source 11 may be disposed between one of the two first side 131 and the light incident surface of the light guide plate 12, while at the other one of the two first side 131, the light source 11 may not be disposed. For example, as shown in FIG. 1, the light source 11 may be disposed between the lower first side 131 and the light incident surface of the light guide plate 12, while at the upper first side 131, the light source 11 may not be disposed. Then in the second direction D2, the light guide plate 12 may have one end facing toward the light source 11 and another end away from the light source 11.

At least one through hole H1 may disposed in the light guide plate 12, and the through hole H1 may penetrate through both a bottom surface and the light exit surface of the light guide plate 12. The bottom surface and the light exit surface (front surface) of the light guide plate 12 may be arranged opposite to each other. The opening of the through hole H1 may have, for example, a circular, a rectangular, and other regular or irregular shape. In the following description, the shape of the opening of the through hole H1 is simply named as the shape of the through hole H1.

In one embodiment, as shown in FIG. 1, a circular shaped through hole H1 is illustrated as an example. The through hole H1 may have a hole wall. In the second direction D2, the through hole H1 may have a first side facing the light source 11 and a second side far away from the light source 11, and the hole wall of the through hole H1 may include a front wall H11 facing the light source 11 and a rear wall H12 far away the light source 11. The light guide plate 1 may have a first region close to the front wall H11 and disposed at the first side of the through hole H1, and a second region close to the rear wall H12 and disposed at the second side of the through hole H1. In other words, the first region of the light guide plate 1 may be disposed between the light source 11 and the first side of the through hole H1, and the second region of the light guide plate 1 may be disposed between the upper first side 131 of the adhesive frame 13 and the second side of the through hole H1.

Because the first region of the light guide plate 12 is disposed between the light source 11 and the through hole H1, the light emitted from the light source 11 may be directly incident onto the first region of the light guide plate 12. Due to the presence of the through hole H1, the light incident onto the first region of the light guide plate 12 may not normally spread further away from the light source 11 (i.e., not normally spread further towards the second side of the through hole H1), thereby forming a bright area at the first region of the light guide plate 12.

In view of this, in the disclosed embodiments, a light adjustment component may be disposed in the through hole H1. In one embodiment, the light adjustment component may include a light absorption layer 101. For example, the light absorption layer 101 may be deposited on the front wall H11 by vapor deposition. The material of the light absorption layer 101 may have light absorption properties. For example, the light absorption layer 101 may include a black or gray coating, and the material and the color of the light absorption layer 101 are not limited by the present disclosure.

The light absorption layer 101 may absorb the light diffused from the light guide plate 112 to the through hole H1 and, meanwhile, absorb excess light at the first region of the light guide plate 12, thereby preventing light from being reflected by the through hole H1 or the hole wall of the through hole H1 back to the first region of the light guide plate 12. Thus, bright areas may be suppressed at the first region of the light guide plate 12, and the brightness of the light emitted from the first region of the light guide plate 12 may be consistent as the brightness of the light emitted from the remained regions of the light guide plate 12.

In one embodiment, the material of the light absorption layer 101 may include graphite powder or ink, or any other appropriate materials capable of absorbing the light diffused from the light guide plate to the through hole H1 and absorbing excess light at the first region of the light guide plate 12, such as metal, metal oxide, metal sulfide, and metal semiconductor material, etc.

Further, in one embodiment, as shown in FIG. 2, the backlight module 01 may further include a bottom reflection sheet 15 and an optical film 16. The bottom reflection sheet 15 may be disposed between the bottom surface of the light guide plate 12 and a back plate 141. The bottom reflection sheet 15 may be configured to reflect the light, which is emitted from the light source 11 to the bottom surface of the light guide plate 12, into the light guide plate 12. The back plate 141 may be integrated with the outer frame 14 (such as iron frame, an aluminum frame). The optical film 16 may be disposed on the light exit surface of the light guide plate 12. The optical film 16 may include, for example, a diffusion sheet, and a prism sheet, etc.

Further, the bottom reflector 15, the optical film 16 and the back plate 141 each may be provided with an opening at a position corresponding to the through hole H1 in the light guide plate 12, and the openings may have the same shape as the through hole H1. After the various components of the backlight module 01 are assembled together, a through hole which penetrate through the entire backlight module 01 may be formed.

Figure 3:
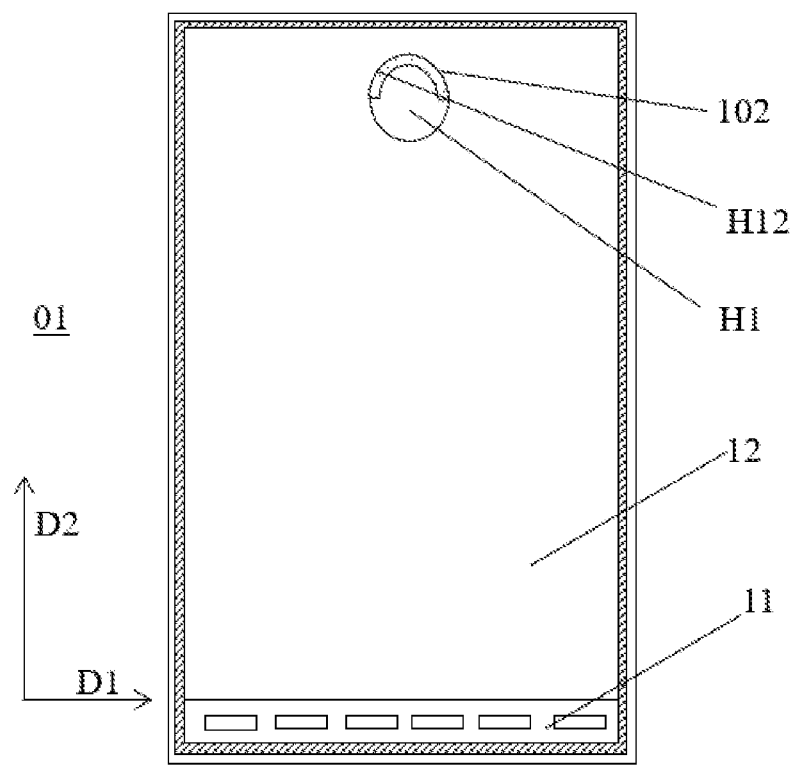
FIG. 3 illustrates a schematic diagram of another exemplary backlight module consistent with disclosed embodiments.

FIG. 3 illustrates a schematic diagram of another exemplary backlight module consistent with disclosed embodiments. The similarities between FIG. 1 and FIG. 3 are not explained, while certain differences may be explained.

As shown in FIG. 3, the backlight module 01 may include a light guide plate 11 and a light source 11. The light guide plate 12 may be provided with a through hole H1 penetrating the bottom surface and the light exit surface of the light guide plate 12. The through hole H1 may have a circular shape.

In the second direction D2, the through hole H1 may have a first side facing the light source 11 and a second side far away from the light source 11, and the hole wall of the through hole H1 may include a front wall H11 facing the light source 11 and a rear wall H12 far away the light source 11. The light guide plate 1 may have a first region close to the front wall H11 and disposed at the first side of the through hole H1, and a second region close to the rear wall H12 and disposed at the second side of the through hole H1.

Because the second region of the light guide plate 12 is disposed between the second side of the through hole H1 and the upper first side 131 of the adhesive frame 13, due to the obstruction of the through hole H1, the light emitted by the light source 11 may be unable to be directly incident onto the second region of the light guide plate 12. Further, due to the obstruction of the through hole H1, the light at the first region of the light guide plate 12 may not be diffused further to the second region of the light guide plate 12 and, thus, dark areas may be formed at the second region of the light guide plate 12.

In view of this, in the disclosed embodiments, a light adjustment component may be disposed in the through hole H1. In one embodiment, the light adjustment component may include a light reflective layer 102. The light reflective layer 102 may be disposed on the rear wall H12 of the through hole H1, for example, coated on the rear wall H12 of the through hole H1 by vapor deposition. The light reflective layer 102 may include a silver layer with strong reflection capability or a coating layer with slightly weak reflection capability. The material of the light reflective layer 102 is not limited by the present disclosure.

The light reflective layer 102 may reflect light, which is diffused by the light guide plate 12 to the rear wall H12, back to the light guide plate 12, such that the brightness of the second region of the light guide plate 12 may be enhanced. Accordingly, dark areas may be suppressed at the second region of the light guide plate 12, and the brightness of the light emitted from the second region of the light guide plate 12 may be consistent as the brightness of the light emitted from remained regions of the light guide plate 12.

In one embodiment, the light adjustment component disposed in the through hole H1 may include both the light absorption layer 101 and the light reflective layer 102. A corresponding structure is shown in FIG. 4.

Figure 4:
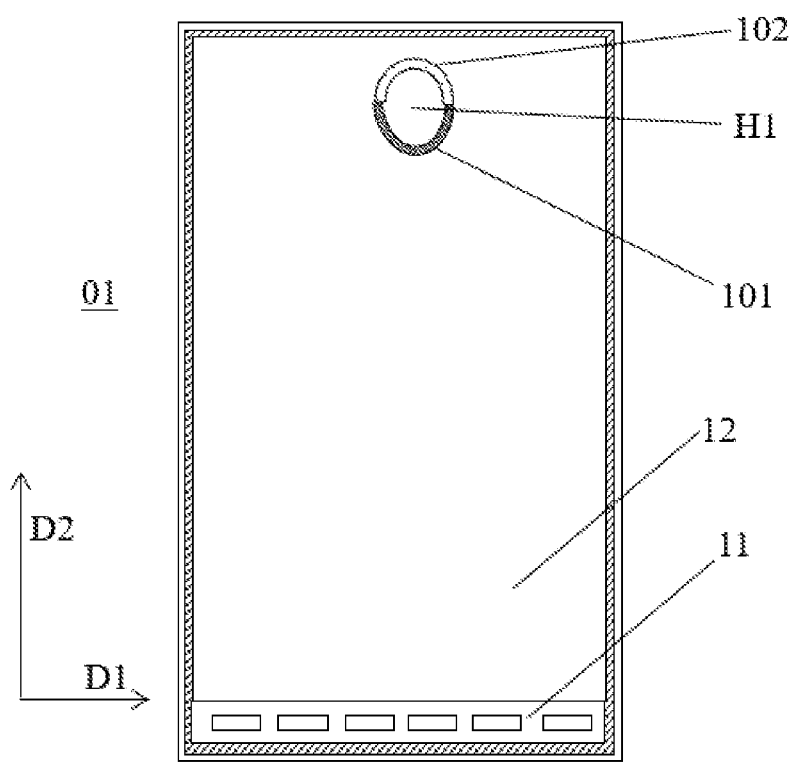
FIG. 4 illustrates a schematic diagram of another exemplary backlight module consistent with disclosed embodiments.

FIG. 4 illustrates a schematic diagram of another exemplary backlight module consistent with disclosed embodiments. The similarities between FIGS. 1-3 and FIG. 4 are not explained, while certain differences may be explained.

As shown in FIG. 4, in the backlight module 01, the light adjustment component may include both the light absorption layer 101 and the light reflective layer 102. In the second direction D2, the through hole H1 may have a first side facing the light source 11 and a second side far away from the light source 11, and the hole wall of the through hole H1 may include a front wall H11 facing the light source 11 and a rear wall H12 far away the light source 11. The light guide plate 1 may have a first region close to the front wall H11 and disposed at the first side of the through hole H1, and a second region close to the rear wall H12 and disposed at the second side of the through hole H1.

The light absorption layer 101 may be disposed on the front wall of the through hole H1, and the reflection layer 102 may be disposed on the rear wall of the through hole H1, such that dark areas may be suppressed at the second region of the light guide plate 12, and bright areas may be suppressed at the first region of the light guide plate 12. The light absorption layer 101 and the light reflective layer 102 in FIG. 4 may have the same material and same formation method as the light absorption layer 101 and the light reflective layer 102 in FIGS. 1-3.

Figure 5:
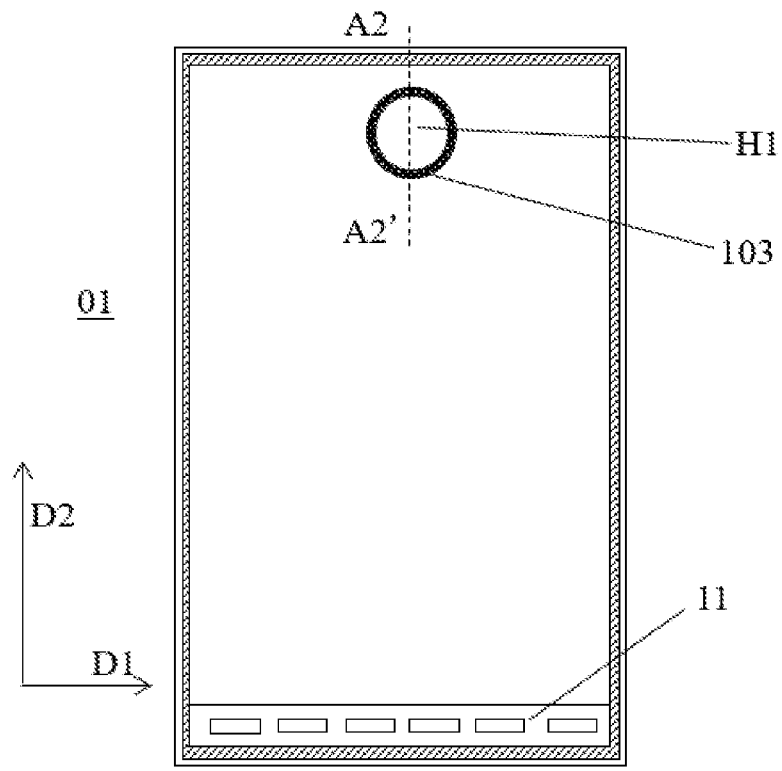
FIG. 5 illustrates a schematic diagram of another exemplary backlight module consistent with disclosed embodiments.
Figure 6:
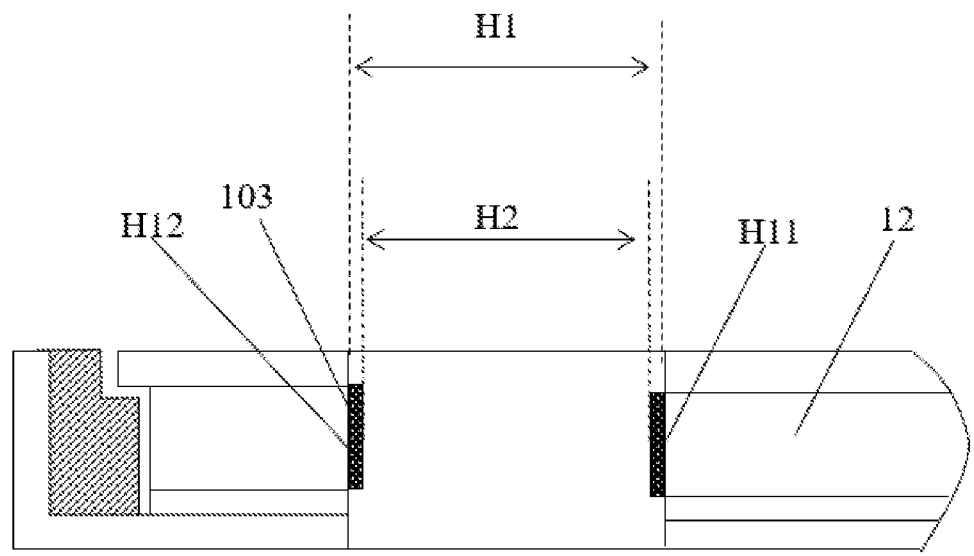
FIG. 6 illustrates an exemplary A2-A2' sectional view of another exemplary backlight module in FIG. 5 consistent with disclosed embodiments.

FIG. 5 illustrates a schematic diagram of another exemplary backlight module consistent with disclosed embodiments, and FIG. 6 illustrates an exemplary A2-A2' sectional view of another exemplary backlight module in FIG. 5 consistent with disclosed embodiments. The similarities between FIGS. 1-2 and FIGS. 5-6 are not explained, while certain differences may be explained.

As shown in FIGS. 5-6, the backlight module 01 may include a light guide plate 12 and a light source 11. A through hole H1 generating through the bottom surface and the light exit surface of the light guide plate 12 may be disposed in the light guide plate 12. The through hole H1 may have a circular shape. Different from the backlight module 01 in FIGS. 1-2, in FIGS. 5-6, the light adjustment component disposed in the through hole H1 may include an auxiliary light guide plate 103. The auxiliary light guide plate 103 may be nested in the through hole H1, where the outer side wall of the auxiliary light guide plate 103 may be attached to the hole wall of the through hole H1. The auxiliary light guide plate 103 may be provided with an inner through hole H2 enclosed by the inner side wall of the auxiliary light guide plate 103. In other words, in the disclosed embodiments, the auxiliary light guide plate 103 may be an annular shape plate surrounded by a peripheral side wall of the auxiliary light guide plate 103, and nested in the through hole H1.

To achieve the light adjustment, in one embodiment, as shown in FIG. 6, the auxiliary light guide plate 103 may have a first portion attached to the front wall H11 of the through hole H1 and an opposing second portion attached to the rear wall H12 of the through hole H1. A plurality of light guiding points may be disposed on the first portion and the second portion of the auxiliary light guide plate 103, in which the density and size of the light guiding points on the first portion and the second portion may be different. In certain embodiments, the density and size of the light guiding points inside the first portion and the second portion may be also different.

In one embodiment, through configuring the density and size of the light guide points of the first portion and the second portion of the auxiliary light guide plate 103, on one hand, the first portion of the auxiliary light guide plate 103 may be configured to guide the light at the first region of the light guide plate 12 to other regions, such that bright areas may be suppressed at the first region of the light guide plate 12. On the other hand, the second portion of the auxiliary light guide plate 103 may be configured to guide the light at the second region of the light guide plate 12 back to the second region of the light guide plate 12 again or guide the light at other regions the light guide plate 12 to the second region of the light guide plate 12, such that dark areas may be suppressed at the second region of the light guide plate 12. In one embodiment, the material of the auxiliary light guide plate 103 may be the same as the material of the light guide plate 12.

Figure 7:
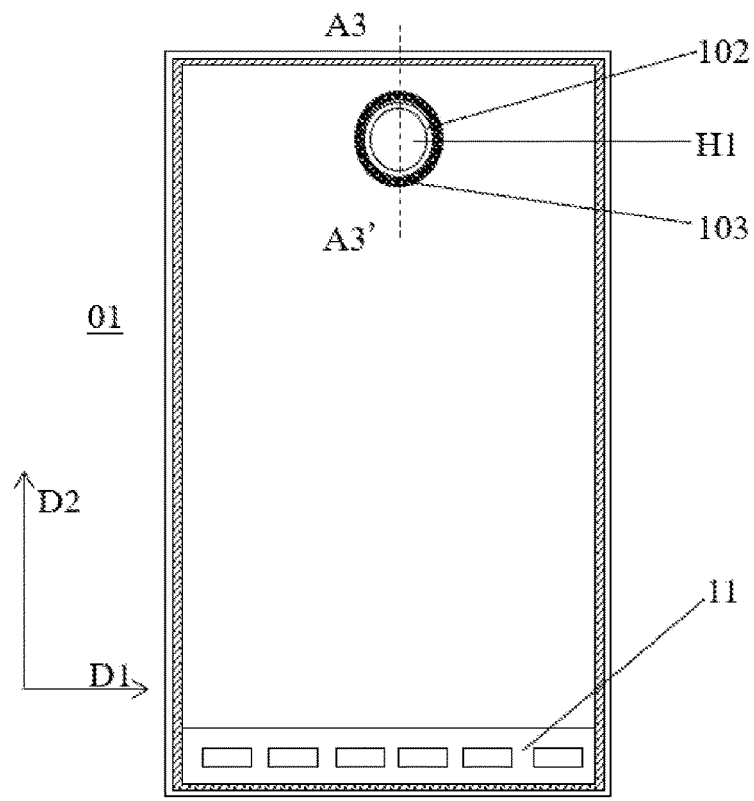
FIG. 7 illustrates a schematic diagram of another exemplary backlight module consistent with disclosed embodiments.
Figure 8:
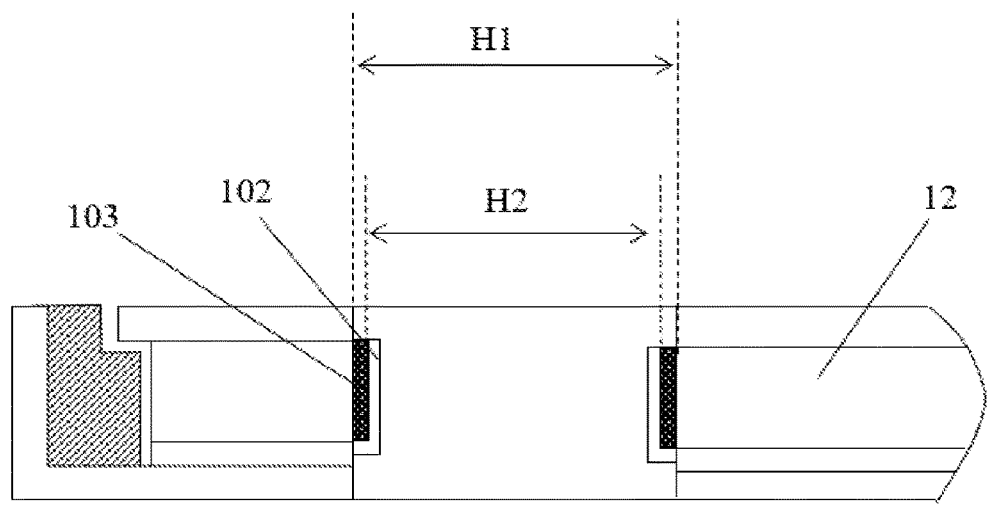
FIG. 8 illustrates an exemplary A3-A3' sectional view of another exemplary backlight module in FIG. 7 consistent with disclosed embodiments.

FIG. 7 illustrates a schematic diagram of another exemplary backlight module consistent with disclosed embodiments, and FIG. 8 illustrates an exemplary A3-A3' sectional view of another exemplary backlight module in FIG. 7 consistent with disclosed embodiments. The similarities between FIGS. 7-8 and FIGS. 5-6 are not explained, while certain differences may be explained.

As shown in FIGS. 7-8, the light adjustment component disposed in the through hole H1 may include an auxiliary light guide plate 103. The auxiliary light guide plate 103 may be nested in the through hole H1, and have an outer side wall facing the hole wall of the through hole H1, and an opposing inner side wall far away from the hole wall of the through hole H1. The auxiliary light guide plate 103 may have an outer side wall facing the hole wall of the through hole H1, and an opposing inner side wall far away from the hole wall of the through hole H1. The outer side wall of the auxiliary light guide plate 103 may be attached to the hole wall of the through hole H1. The auxiliary light guide plate 103 may be provided with an inner through hole H2 enclosed by the inner side wall of the auxiliary light guide plate 103. In other words, in the disclosed embodiments, the auxiliary light guide plate 103 may be an annular shape plate surrounded by a peripheral side wall of the auxiliary light guide plate 103, and nested in the through hole H1.

Different from the backlight module in FIGS. 5-6, the light adjustment component in FIGS. 7-8 may further include a reflection layer 102. The reflection layer 102 may be disposed on the inner side wall of the auxiliary light guide plate 103, i.e., the inner side wall of the inner through hole H2. For example, the reflection layer 102 may be coated on the inner side wall of the through hole H2 by vapor deposition. The light reflective layer 102 may include a silver layer with strong reflection capability or may be a coating layer with slightly weak reflection capability. The material of the light reflective layer 102 is not limited by the present disclosure.

The light reflective layer 102 may reflect light, which is diffused by the auxiliary light guide plate 103 to the inner through hole H2, back to the auxiliary light guide plate 103. Then the light reflected back to the auxiliary light guide plate 103 may be redistributed by the auxiliary light guide plate 103, such that the brightness of the second region of the light guide plate 12 may be enhanced, while the brightness of the first region of the light guide plate 12 may be degraded. Accordingly, the brightness of the light emitted from the first region and the second region of the light guide plate 12 may be consistent as the brightness of the light emitted from remained regions of the light guide plate 12.

In one embodiment, the light reflective layer 102 may cover both the inner side wall and the bottom surface of the auxiliary light guide plate 103, thereby reflecting light, which is diffused by the auxiliary light guide plate 103 to the bottom surface of the auxiliary light guide plate 103, back to the auxiliary light guide plate 103. Accordingly, the backlight utilization efficiency may be further improved.

Figure 9:
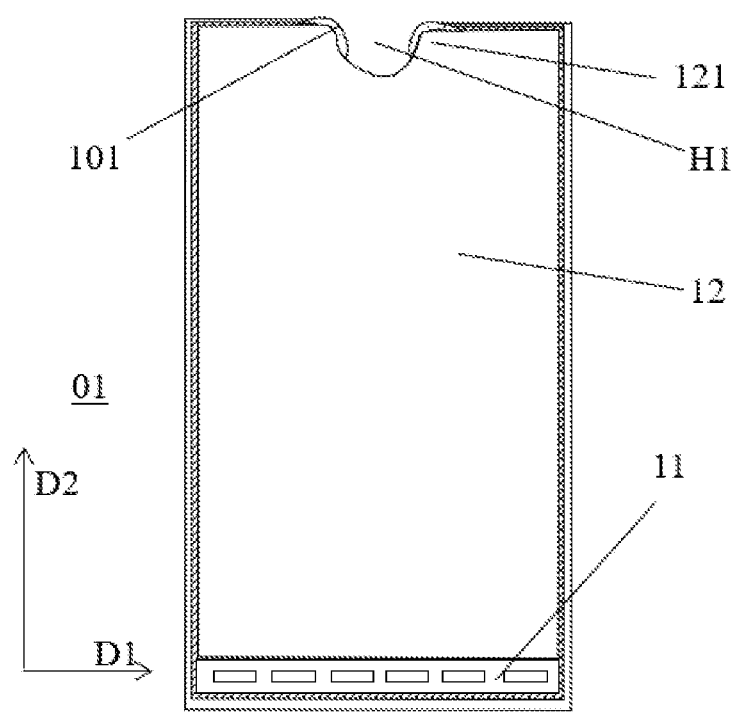
FIG. 9 illustrates a schematic diagram of another exemplary backlight module consistent with disclosed embodiments.

FIG. 9 illustrates a schematic diagram of another exemplary backlight module consistent with disclosed embodiments. The similarities between FIGS. 1-2 and FIG. 9 are not explained, while certain differences may be explained.

Similar to the backlight module in FIGS. 1-2, the backlight module 01 in FIG. 9 may include a light guide plate 12 and a light source 11. The light guide plate 12 may be provided with a through hole H1 penetrating the bottom surface and the light exit surface of the light guide plate 12. Different from the backlight module in FIGS. 1-2, the through hole H1 in the backlight module 01 in FIG. 9 may have an open shape, such as a semicircular, a rectangular, and other regular or irregular shape. The light guide plate 12 may have a lower first side close to the light source 11 and an opposing upper first side far away from the light source 11. The through hole H1 may be arranged at the upper first side of the light guide plate 12, i.e., the side far away from the light source 11.

The two ends of the hole wall of the through hole H1 each may be respectively connected to a side of the light guide plate 12 (e.g., an upper side in FIG. 9) to form a corner 121. The light emitted from the light source 11 may be directly incident onto the corner 121 of the light guide plate 12. Due to the presence of the through hole H1, the light incident onto the corner 121 of the light guide plate 12 may not spread further away from the light source 11, thereby forming a bright area at the corner 121.

In view of this, in the disclosed embodiments, a light adjustment component may be disposed in the through hole H1. In one embodiment, the light adjustment component may include a light absorption layer 101. The light absorption layer 101 may include two portions, each of which may be disposed on a portion of the hole wall of the through hole H1 where the portion of the hole wall is corresponding to the corner 121 and, meanwhile, each of which may be extending to the upper side of the light guide plate 12 that is connected to one end of the hole wall.

The material of the light absorption layer 101 may have the light absorbing properties. For example, the light absorption layer 101 may be a black or gray coating, and the material and color of the light absorption layer 101 are not limited by the present disclosure. The light absorption layer 101 may absorb light which is diffused from the light guide plate 12 to the through hole H1 and, meanwhile, absorb excessive light emitted from the light guide plate 12 at the corner 121, such that the light may be prevented from being reflected back to the corner 121 of the light guide plate 12 by the through hole H1 or the hole wall of the through hole H1. Accordingly, bright areas may be suppressed at the corner 121 of the light guide plate 12, and the brightness of the light emitted from the corners 121 of the light guide plate 12 may be consistent as the brightness of the light emitted from remained regions of the light guide plate 12.

Figure 10:
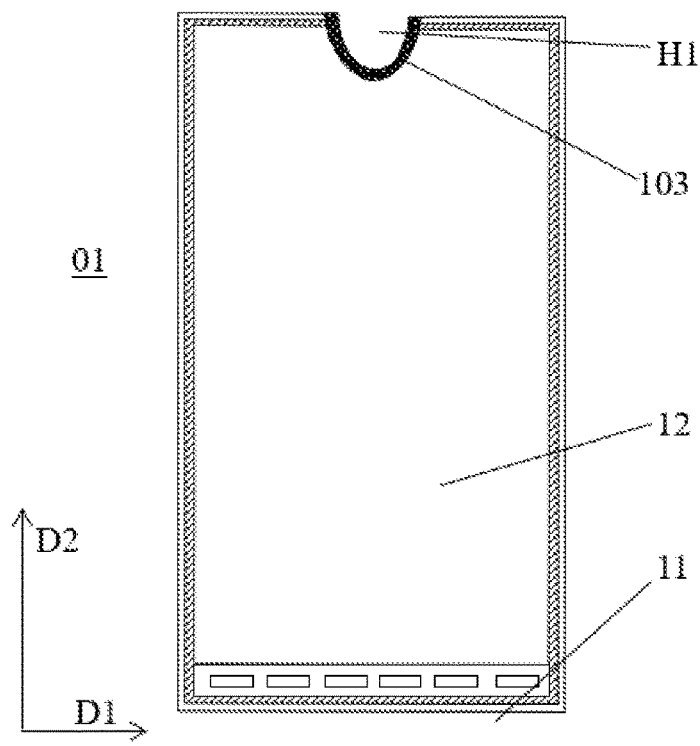
FIG. 10 illustrates a schematic diagram of another exemplary backlight module consistent with disclosed embodiments.

FIG. 10 illustrates a schematic diagram of another exemplary backlight module consistent with disclosed embodiments. The similarities between FIG. 10 and FIG. 9 are not explained, while certain differences may be explained.

Similar to the backlight module in FIG. 9, the backlight module 01 in FIG. 10 may include a light guide plate 12 and a light source 11. The light guide plate 12 may be provided with a through hole H1 penetrating the bottom surface and the light exit surface of the light guide plate 12, and the through hole H1 may have an open shape.

Different from the backlight module in FIG. 9, in the backlight module 01 in FIG. 10, the light adjustment component disposed in the through hole H1 may include an auxiliary light guide plate 103. The auxiliary light guide plate 103 may be nested in the through hole H1, where the outer side wall of the auxiliary light guide plate 103 may be attached to the hole wall of the through hole H1. The auxiliary light guide plate 103 may be nested in the through hole H1, and the auxiliary light guide plate 103 may be provided with an inner through hole H2 enclosed by the inner side wall of the auxiliary light guide plate 103. The inner through hole may have the same shape as the through hole H1. The two ends of the hole wall of the through hole H1 may be respectively connected to the upper side of the light guide plate 12 to form a corner 121, and two ends of the auxiliary light guide plate 103 may be respectively extending to the corner.

In one embodiment, as shown in FIG. 10, through configuring the density and size of the light guide points of the auxiliary light guide plate 103, the auxiliary light guide plate 103 may be configured to guide the light at the corners 121 of the light guide plate 12 to other regions, such that bright areas may be suppressed at the corners 121 of the light guide plate 12.

Figure 11:
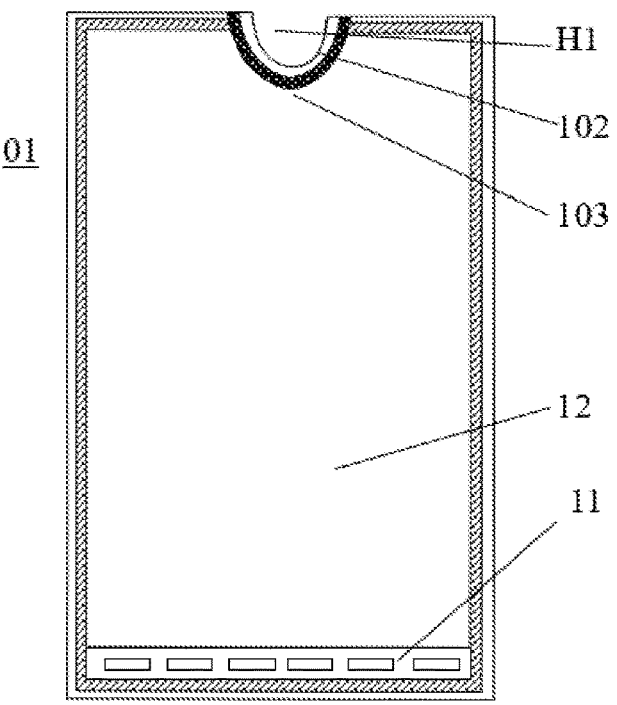
FIG. 11 illustrates a schematic diagram of another exemplary backlight module consistent with disclosed embodiments.

FIG. 11 illustrates a schematic diagram of another exemplary backlight module consistent with disclosed embodiments. The similarities between FIG. 10 and FIG. 11 are not explained, while certain differences may be explained.

As shown in FIG. 11, the light adjustment component may further include a reflection layer 102 disposed on the inner side wall of the auxiliary light guide plate 103. The inner side wall of the auxiliary light guide plate 103 may be far away from the light guide plate 12 and the outer side wall of the auxiliary light guide plate 103 may be close to the light guide plate 12. The reflection layer 102 may reflect the light, which is diffused from the auxiliary light guide plate 103 to the inner through hole, back to the auxiliary light guide plate 103, and the reflected light may be redistributed by the auxiliary light guide plate 103. Thus, the brightness at the corner 121 of the light guide plate 12 may be further reduced, and the brightness of the light emitted from the corners 121 of the light guide plate 12 may be consistent as the brightness of the light emitted from remained regions of the light guide plate 12.

The present disclosure further provides a display device comprising any one of the disclosed backlight modules.

Figure 12:
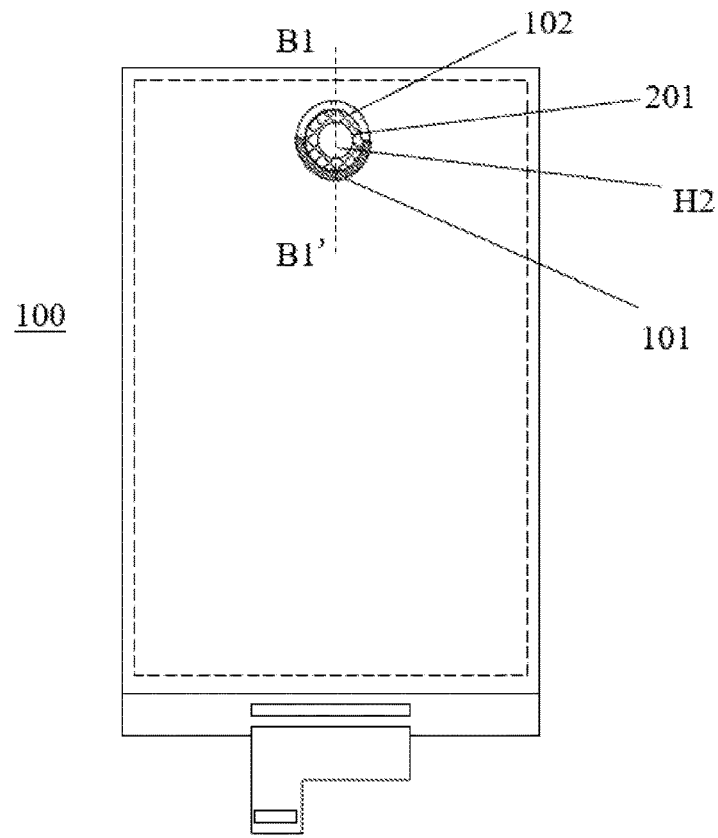
FIG. 12 illustrates a schematic diagram of an exemplary display device consistent with disclosed embodiments.
Figure 13:
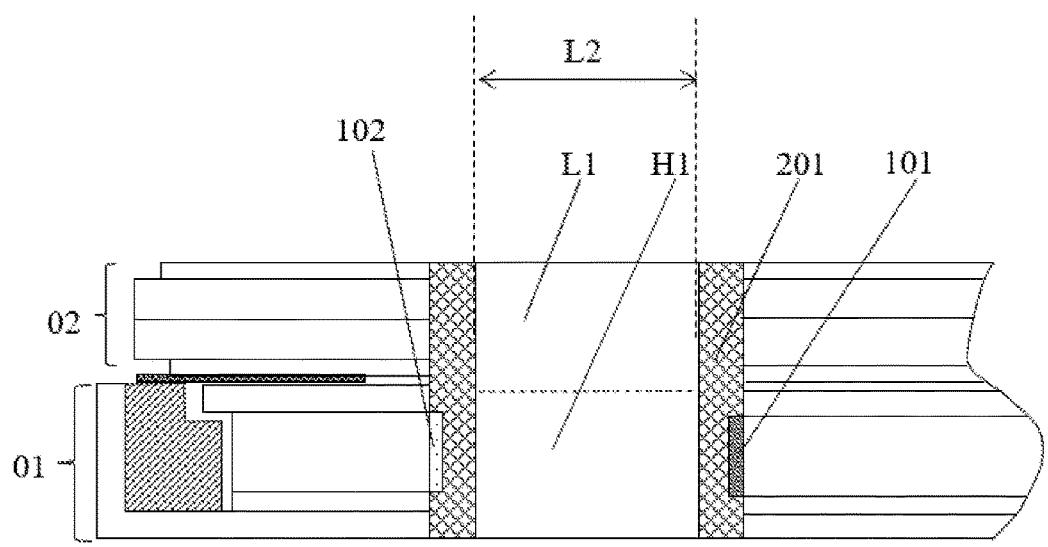
FIG. 13 illustrates an exemplary B1-B1' sectional view of an exemplary display device in FIG. 12 consistent with disclosed embodiments.

FIG. 12 illustrates a schematic diagram of an exemplary display device consistent with disclosed embodiments, and FIG. 13 illustrates an exemplary B1-B1' sectional view of an exemplary display device in FIG. 12 consistent with disclosed embodiments. As shown in FIG. 12 and FIG. 13, the display device 100 may include a liquid crystal display panel 02 and a backlight module 01. The backlight module 01 may be any one of the disclosed backlight modules, which provides an external light source for the liquid crystal display panel 02 to display images.

In one embodiment, as shown in FIGS. 12-13, the liquid crystal display panel 02 may include an array substrate and a color filter substrate arranged opposite to each other, and a liquid crystal layer sandwiched between the array substrate and the color filter substrate. The array substrate may be provided with a driving array for driving the image display, and a step area exposed outside the coverage area of the color filter substrate. The step area may be bound to a flexible circuit board and connected with the external driving circuit through the flexible circuit board. To increase the screen-to-body ratio of the display device i.e., to reduce the size of the non-display area of the display device as much as possible, in the disclosed embodiments, the edge of the light source of the backlight module 01 may coincide with the edge of the step area of the array substrate, and the through hole H1 in the backlight module 01 may be disposed on a side far from the step area of the liquid crystal display panel 02.

The liquid crystal display panel 02 may be provided with a through hole L1 at a position corresponding to the through hole H1 of the backlight module 01. The shape of the through hole L1 may be the same as the shape of the through hole H1. The through hole L1 may penetrate the array substrate, the liquid crystal layer, and the color filter substrate. When the liquid crystal display panel further includes upper and lower polarizers, the through hole L1 may penetrate the array substrate, the liquid crystal layer, the color filter substrate, and the upper and lower polarizers.

The display device may be further provided with a nested base 201, which may be sequentially nested in the through hole L1 and the through hole H1. A light adjustment component, such as the light absorption layer 101 and/or the light reflective layer 102, may be disposed between the hole wall of the through hole H1 and the nested base 201. The nested base 201 may be provided with an inner through hole L2 surrounded by the inner wall of the base body. For example, when the through hole L1 and the through hole H1 have a circular shape, the nested base 201 may have a closed ring structure, which may protect the light adjustment component from the external mechanical force. The material of the nested base 201 may be metal or plastic, which is not limited by the present discourse.

The nested base 201 may have an outer side wall in direct contact with the light guide plate 12 and an inners side wall far away from the light guide plate 12. The light adjustment component, such as the light absorption layer 101 and/or the light reflective layer 102, may also be directly coated on the outer side wall of the nested base 201. After the backlight module and the liquid crystal display panel are assembled, the nested base 201 may be nested in the through hole L1 and the through hole H1.

In the discoed embodiment, as shown in FIGS. 12 and 13, the light adjustment component may include a light absorption layer 101 and a light reflective layer 102. The hole wall of the through hole H1 may have a first side facing the light source in the backlight module 01 and an opposing second side. The light absorption layer 101 may be disposed on the first side of the hole wall of the through hole H1, and light reflective layer 102 may be disposed on the second side of the hole wall of the through hole H1. Thus, both bright areas and dark areas may be suppressed in the light guide plate in the display device. In another embodiment, only one of the light absorption layer and the reflection layer may be disposed on the hole wall of the through hole H1, which is not limited by the present disclosure.

Figure 14:
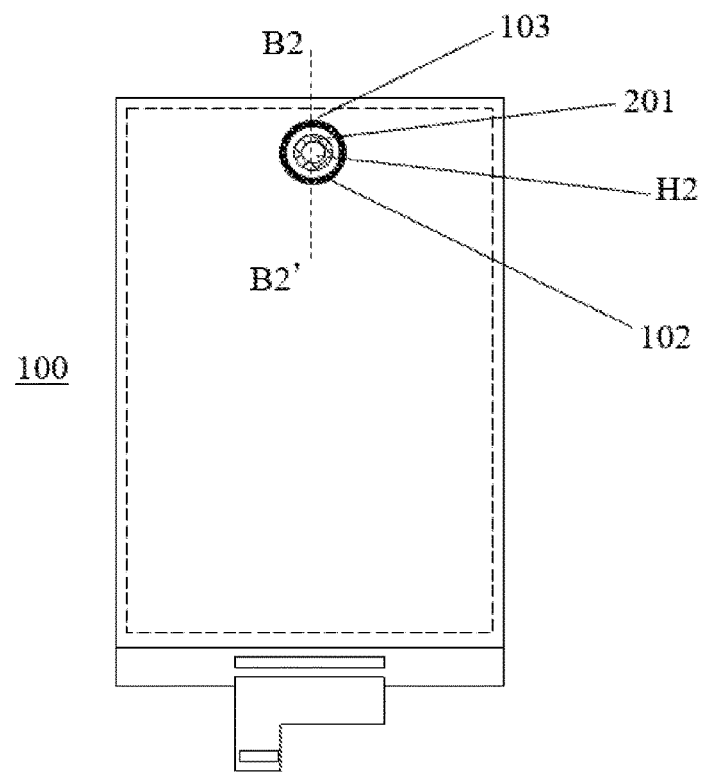
FIG. 14 illustrates a schematic diagram of another exemplary display device consistent with disclosed embodiments.
Figure 15:
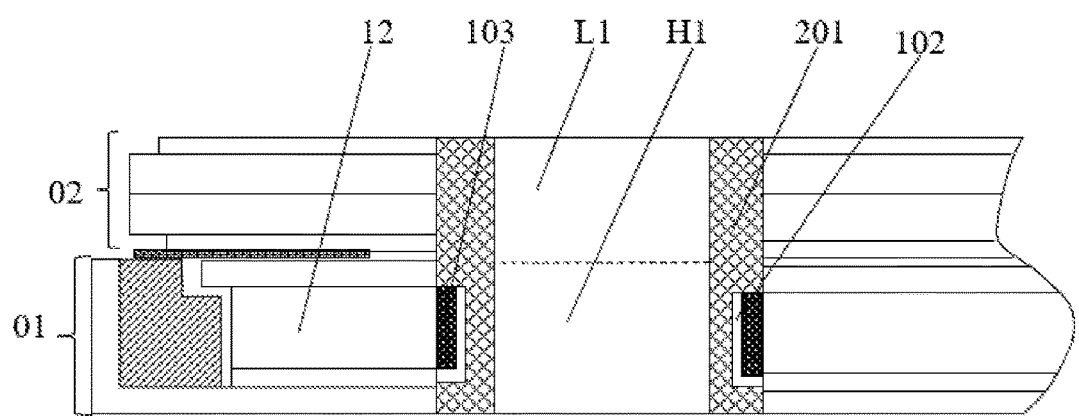
FIG. 15 illustrates an exemplary B2-B2' sectional view of another exemplary display device in FIG. 14 consistent with disclosed embodiments.

FIG. 14 illustrates a schematic diagram of another exemplary display device consistent with disclosed embodiments, and FIG. 15 illustrates an exemplary B2-B2' sectional view of an exemplary display device in FIG. 14 consistent with disclosed embodiments. The similarities between FIGS. 14-15 and FIGS. 12-13 are not explained, while certain differences may be explained.

As shown in FIGS. 14-15, similar to the display device 100 in FIGS. 12-13, the display device 100 in FIGS. 14-15 may include a liquid crystal display panel 02 and a backlight module 01. The display device may be further provided with a nested base 201, which may be sequentially nested in the through hole L1 and the through hole H1. Different from the display device 100 in FIGS. 12-13, in the display device 100 in FIGS. 14-15, the light adjustment component may include a light reflective layer 102 and an auxiliary light guide plate 103. The ring-shaped nested base 201 may be sequentially nested in the through hole L1 and the through hole H1. The ring-shaped auxiliary light guide plate 103 may be disposed between the nested base 201 and the hole wall of the through hole H1. The ring-shaped light reflective layer 102 may be disposed between the nested base 201 and the inner side wall of the auxiliary light guide plate 103. That is, the light reflective layer 102 and the auxiliary light guide plate 103 may be fixed in the through hole H1 by the nested base 201.

In one embodiment, through configuring the density and size of the light guide points of the first portion and the second portion of auxiliary light guide plate 103, on one hand, the first portion of the auxiliary light guide plate 103 may be configured to guide the light at the first region of the light guide plate 12 to other regions, such that bright areas may be suppressed at the first region of the light guide plate 12; on the other hand, the second portion of the auxiliary light guide plate 103 may be configured to guide the light at the second region of the light guide plate 12 back to the second region of the light guide plate 12 again or guide the light at other regions the light guide plate 12 to the second region of the light guide plate 12, such that dark areas may be suppressed at the second region of the light guide plate 12. In one embodiment, the material of the auxiliary light guide plate 103 may be the same as the material of the light guide plate 12.

Further, the light reflective layer 102 may reflect the light, which is diffused by the auxiliary light guide plate 103 to the inner through hole, back to the auxiliary light guide plate 103, then the light reflected back to the auxiliary light guide plate 103 may be redistributed by the auxiliary light guide plate 103, such that the brightness uniformity across the entire light exit surface of the light guide plate 12 may be enhanced.

In one embodiment, the light reflective layer 102 may cover both the inner side wall and the bottom surface of the auxiliary light guide plate 103, thereby reflecting the light, which is reflected by the auxiliary light guide plate 103 towards the bottom surface of the auxiliary light guide plate 103, back to the auxiliary light guide plate 103. Accordingly, the light utilization efficiency of the backlight module may be improved.

In another embodiment, the light adjustment component may only include the auxiliary light guide plate, which may be fixed in the through hole H1 by the nested base 201.

The nested base shown in FIG. 15 may have a one-piece structure. For example, when the through hole H1 has a circular shape and the nested base has a one-piece ring shape, to facilitate the assembly process, the nested base may be configured to have a shape shown in FIG. 16.

Figure 16:
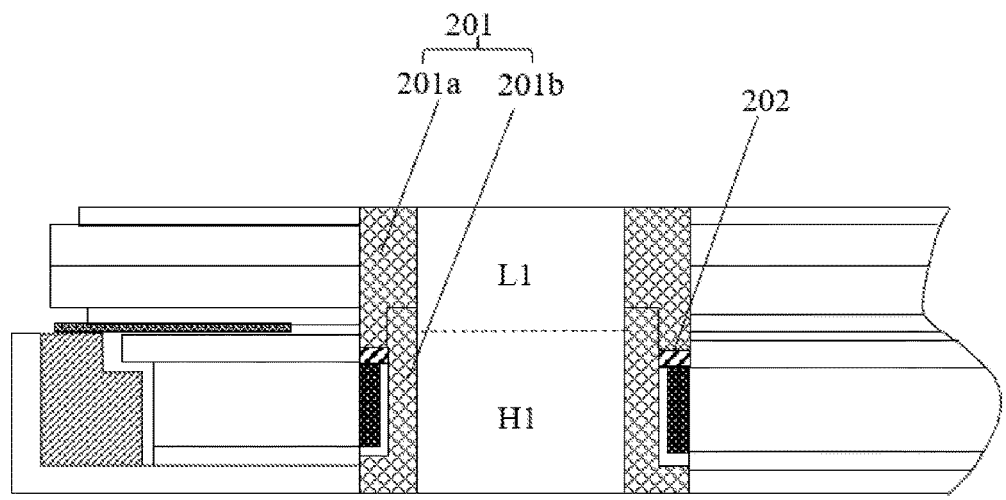
FIG. 16 illustrates another exemplary B2-B2' sectional view of another exemplary display device in FIG. 14 consistent with disclosed embodiments.

FIG. 16 illustrates another exemplary B2-B2' sectional view of another exemplary display device in FIG. 14 consistent with disclosed embodiments. As shown in FIG. 16, the nested base 201 may include an upper base 201a and a lower base 201b that are mutually fitted together, and a light adjustment component (such as an auxiliary light guide plate, a reflective layer or a light absorption layer) may be disposed between the nested base 201 and the light guide plate 12.

In a direction perpendicular to the light exit surface of the light guide plate, the through hole L1 may have a first side facing the through hole H1 and an opposing second side far away from the through hole H1. The through hole H1 may have a first side facing the through hole L1 and an opposing second side far away from the through hole L1.

During the assembly process, the upper base 201a may be fitted from the second side of the through hole L1, the lower base 201b may be fitted from the second side of the through hole H1, and then the upper base 201a and the lower based 201b may be fitted with each other through a bonding surface, thereby fixing the light adjustment component. In one embodiment, one of the upper base 201a and the lower base body 201b may be provided with a protrusion, and the other of the upper base 201a and the lower base body 201b may be provided with a groove corresponding to the protrusion. The auxiliary light guide plate 103 may be disposed in a space formed by the hole wall of the at least one through hole H1, the upper base 201a and the lower base 201b.

Further, the nested base 201 may further include a retaining washer 202. The upper surface of the auxiliary light guide plate may be in contact with the upper base 201a. When the upper base 201a is disposed on the upper surface of the light adjustment component (such as the auxiliary light guide plate), the retaining washer 202 may be disposed between the upper surface of the auxiliary light guide plate and the bottom surface of the upper base 201a, thereby protecting the auxiliary light guide plate from the destruction of the external mechanical force, such as the frictional force exerted on the auxiliary light guide plate by the upper base 201a. The material of the retaining washer 202 may include, for example, resin, rubber, plastics, and plastic, etc.

Figure 17:
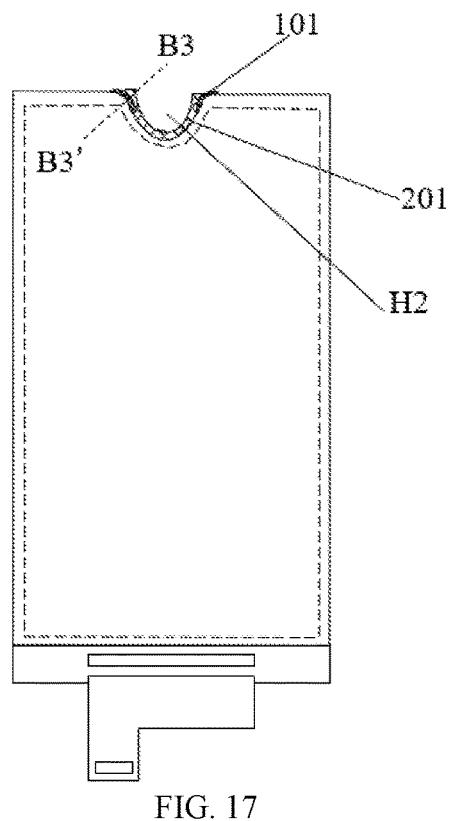
FIG. 17 illustrates a schematic diagram of another exemplary display device consistent with disclosed embodiments.
Figure 18:
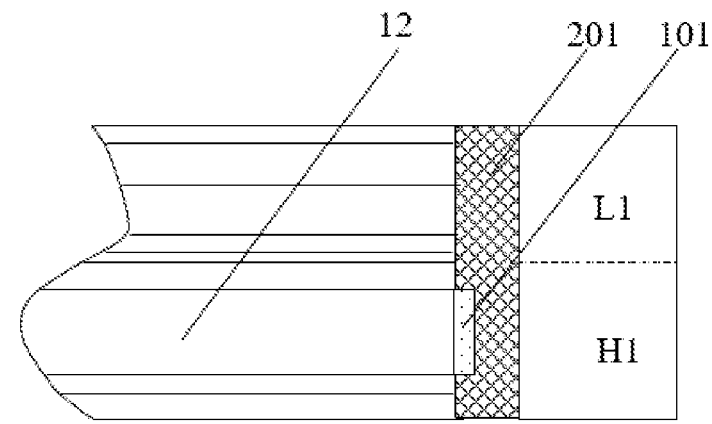
FIG. 18 illustrates an exemplary B3-B3' sectional view of another exemplary display device in FIG. 17 consistent with disclosed embodiments.

FIG. 17 illustrates a schematic diagram of another exemplary display device consistent with disclosed embodiments, and FIG. 18 illustrates an exemplary B3-B3' sectional view of another exemplary display device in FIG. 17 consistent with disclosed embodiments.

As shown in FIGS. 17-18, the display device may have a similar structure as the display device in FIG. 12. That is, the display device may include a backlight module and a liquid crystal display panel. A through hole H1 penetrating therethrough may be provided in the backlight module. Different from the display device in FIG. 12, in the display device in FIGS. 17-18, the through hole L1 and the through hole H1 each may have an open shape, such as a semicircular, a rectangular, and other regular or irregular shape.

In one embodiment, the light adjustment component may include a light absorption layer 101 disposed on a portion of the hole wall in which the portion of the hole wall is corresponding to the corner of the through hole H1. The light absorption layer 101 may be extending to the upper side of the light guide plate 12, where the upper side of the light guide plate 12 is connected to one end of the hole wall. The nested base 201 may have a semicircular shape, and may fix the light absorption layer 101. A semicircular inner through hole H2 may be provided in the nested base 201.

In another embodiment, the light adjustment component may include an auxiliary light guide plate 103 and a light reflective layer 102, which may be fixed in the through hole L1 and the through hole H1 by the nested base 201. A corresponding structure is shown in FIG. 19.

Figure 19:
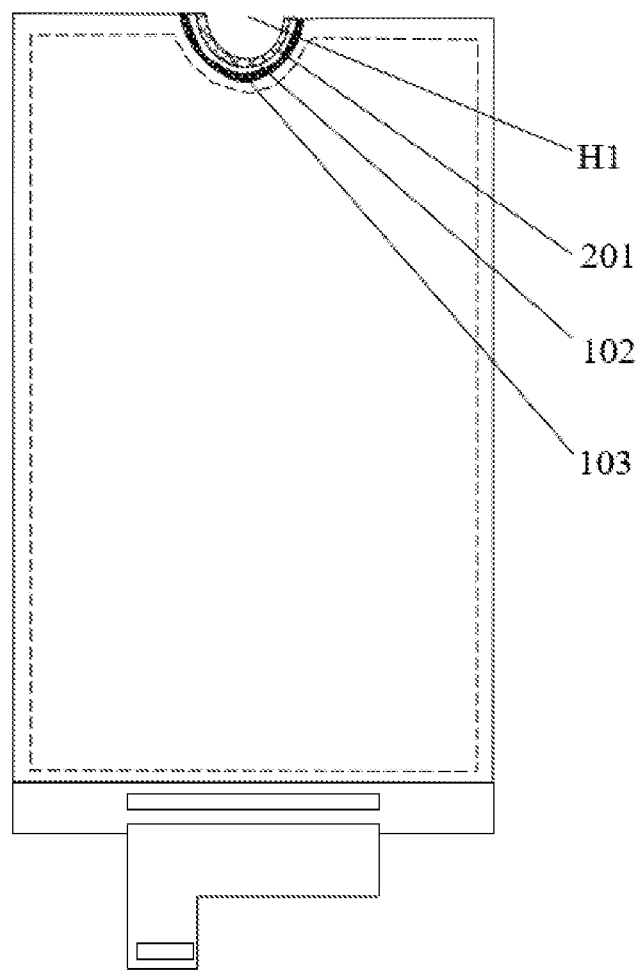
FIG. 19 illustrates a schematic cross-sectional view of an exemplary display device consistent with disclosed embodiments.

FIG. 19 illustrates a schematic cross-sectional view of an exemplary display device consistent with disclosed embodiments. As shown in FIG. 19, the display device may further include a camera module, and a camera of the camera module may be disposed in the through hole L1 and the through hole H1, or may be disposed in the inner through hole of the nested base.

In certain embodiment, the display device may further include an audio module. The audio module may include, for example, a receiver for transmitting sound. The audio module may be disposed in the through hole L1 and the through hole H1, or in the inner through hole of the nested base.

The disclosed display device may be a mobile phone, a computer, a television, and a car-mounted display device, etc. Further, the disclosed display device may be any appropriate display devices having a display function, which is not limited by the present disclosure.

The present disclosure provides a backlight module comprising a light guide plate and a light source. The light source may be disposed on at least one side of the light guide plate, and a light exit surface of the light source may face a light incident surface of the light guide plate. At least one through hole may be disposed in the light guide plate, and a light adjustment component may be disposed in the at least one through hole.

The present disclosure further provides a display device comprising the disclosed backlight module, a liquid crystal display panel and a nested base. The nested base may be sequentially nested in a through hole of the liquid crystal display panel and the at least one through hole of the backlight module. The light adjustment component may be disposed between the hole wall of the at least one through hole and the nested base, and the nested base may be provided with an inner through hole surrounded by the inner wall of the base body.

In the disclosed embodiments, the light adjustment component may be disposed in the backlight module and the irregular-shaped region of the display device, such that bright areas and/or dark areas, which are likely to occur at the irregular-shaped region of the existing display devices, may be suppressed.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A backlight module, comprising:
a light guide plate having a light incident surface; and
a light source disposed on at least one side of the light guide plate, wherein a light exit surface of the light source faces the light incident surface of the light guide plate,
wherein at least one through hole is disposed in the light guide plate, and a hole wall of the at least one through hole includes a first wall facing the light source and a second wall far away from the light source, and
a light adjustment component is disposed in the at least one through hole, wherein the light adjustment component includes a light absorption layer disposed on the first wall of the at least one through hole, and a light reflective layer, opposing the light absorption layer, disposed on the second wall of the at least one through hole.

2. The backlight module according to claim 1, wherein:
the hole wall of the at least one through hole includes a front wall facing the light source; and
the light absorption layer is disposed on the front wall of the at least one through hole.

3. The backlight module according to claim 1, wherein:
the hole wall of the at least one through hole includes a rear wall far away from the light source; and
the light reflective layer is disposed on the rear wall of the at least one through hole.

4. The backlight module according to claim 1, wherein:
the hole wall of the at least one through hole includes a front wall facing the light source and a rear wall far away from the light source; and
the light absorption layer is disposed on the front wall of the at least one through hole, and the light reflective layer is disposed on the rear wall of the at least one through hole.

5. The backlight module according to claim 1, wherein:
the light adjustment component includes an auxiliary light guide plate nested inside the at least one through hole;
an outer side wall of the auxiliary light guide plate is attached to the hole wall of the at least one through hole; and
the auxiliary light guide plate is provided with an inner through hole enclosed by an inner side wall of the auxiliary light guide plate.

6. The backlight module according to claim 5, wherein:
the light reflective layer is disposed on an inner side wall of the inner through hole in the auxiliary light guide plate.

7. The backlight module according to claim 1, wherein:
the light guide plate has a first side close to the light source and an opposing second side far away from the light source, and the at least one through hole is disposed at the second side of the light guide plate;
the at least one through hole has an open shape;
two ends of the hole wall of the at least one through hole each is connected to the second side of the light guide plate to form a corner;
wherein the light absorption layer is disposed on a portion of the hole wall of the at least one through hole where the portion of the hole wall of the at least one through hole is corresponding to the corner.

8. The backlight module according to claim 7, wherein:
the light absorption layer is extending to the second side of the light guide plate, wherein the second side of the light guide plate is connected to one of the two ends of the hole wall of the at least one through hole.

9. The backlight module according to claim 1, wherein:
the light guide plate has a first side close to the light source and an opposing second side far away from the light source, and the at least one through hole is disposed arranged at the second side of the light guide plate;
the at least one through hole has an open shape;
two ends of the hole wall of the at least one through hole each is connected to the second side of the light guide plate to form a corner; and
the light adjustment component includes an auxiliary light guide plate,
wherein an outer side wall of the auxiliary light guide plate is attached to the hole wall of the at least one through hole,
two ends of the auxiliary light guide plate each is extending to the corner, and
the auxiliary light guide plate is provided with an inner through hole enclosed by an inner side wall of the auxiliary light guide plate.

10. The backlight module according to claim 9, wherein:
the light adjustment component further includes a reflection layer disposed on the inner side wall of the auxiliary light guide plate.

11. The backlight module according to claim 1, wherein:
the at least one through hole has a circular shape, a rectangular shape, or a semicircular shape.

12. The backlight module according to claim 1, further comprising:
a bottom reflection sheet and an optical film,
wherein the bottom reflection sheet is disposed between the light guide plate and the bottom reflection sheet,
the bottom reflection sheet and the optical film each is provided with an opening at a position corresponding to the at least one through hole in the light guide plate, and
the opening has a same shape as the at least one through hole.

13. The backlight module according to claim 1, wherein:
the light source includes an LED stripe, and
the LED stripe includes a printed circuit board and a plurality of LEDs mounted on and electrically connected to the printed circuit board.

14. A display panel, comprising:
a liquid crystal display panel; and
a backlight module,
wherein the backlight module comprises:
a light guide plate having a light incident surface; and
a light source disposed on at least one side of the light guide plate, wherein a light exit surface of the light source faces the light incident surface of the light guide plate,
wherein at least one through hole is disposed in the light guide plate, and a hole wall of the at least one through hole includes a first wall facing the light source and a second wall far away from the light source, and
a light adjustment component is disposed in the at least one through hole, wherein the light adjustment component includes a light absorption layer disposed on the first wall of the at least one through hole, and a light reflective layer, opposing the light absorption layer, disposed on the second wall of the at least one through hole.

15. The display panel according to claim 14, further comprising:
a nested base sequentially nested in the through hole in the liquid crystal display panel and the at least one through hole in the backlight module,
wherein the light adjustment component is disposed between a hole wall of the at least one through hole and the nested base, and
the nested base is provided with an inner through hole enclosed by an inner side wall of the nested base.

16. The display panel according to claim 15, wherein:
the light adjustment component further includes an auxiliary light guide plate, and
the light reflective layer is disposed between the nested base and the auxiliary light guide plate.

17. The display panel according to claim 15, wherein:
the light adjustment component includes an auxiliary light guide plate; and
the nested base includes an upper base and a lower base that are mutually fitted together,
wherein the auxiliary light guide plate is disposed in a space formed by the hole wall of the at least one through hole, the upper base and the lower base.

18. The display panel according to claim 17, wherein:
an upper surface of the auxiliary light guide plate is in contact with the upper base of the nested base; and
the nested base furthers include a retaining washer disposed between the upper base and the upper surface of the auxiliary light guide plate.

19. The display panel according to claim 15, wherein:
a material of the nested base includes metal or plastic.

20. The display panel according to claim 14, further comprising one of the following:
a camera module, wherein the camera module includes a camera disposed in the through hole in the liquid crystal display panel and the at least one through hole in the backlight module; and
an audio module, wherein the audio module includes a receiver disposed in the through hole in the liquid crystal display panel and the at least one through hole in the backlight module.

* * * * *